(12) United States Patent
Maher et al.

(10) Patent No.: US 11,739,732 B2
(45) Date of Patent: Aug. 29, 2023

(54) OFF-SHORE WIND TURBINE SYSTEM AND METHOD OF INSTALLATION

(71) Applicant: Trendsetter Vulcan Offshore, Inc., Houston, TX (US)

(72) Inventors: James Maher, Houston, TX (US); Kim Mittendorf, Houston, TX (US)

(73) Assignee: TRENDSETTER VULCAN OFFSHORE, INC., Houston, TX (US)

( * ) Notice: Subject to any disclaimer, the term of this patent is extended or adjusted under 35 U.S.C. 154(b) by 0 days.

(21) Appl. No.: 18/098,399

(22) Filed: Jan. 18, 2023

(65) Prior Publication Data
US 2023/0160369 A1    May 25, 2023

Related U.S. Application Data

(63) Continuation of application No. PCT/US2022/038015, filed on Jul. 22, 2022.
(Continued)

(51) Int. Cl.
*F03D 13/25* (2016.01)
*B63B 21/20* (2006.01)
(Continued)

(52) U.S. Cl.
CPC .............. *F03D 13/25* (2016.05); *B63B 21/20* (2013.01); *B63B 21/50* (2013.01); *B63B 35/44* (2013.01);
(Continued)

(58) Field of Classification Search
CPC ......... F03D 13/25; F03D 13/10; B63B 21/20; B63B 21/50; B63B 35/44; B63B 39/03; B63B 2021/203; B63B 2035/446; E02D 27/425; E02D 27/525; E02D 2600/20; E02B 2017/0091; E02B 17/04; E02B 2017/0039; E02B 2017/0043;
(Continued)

(56) References Cited

U.S. PATENT DOCUMENTS 7,508,088 B2    3/2009  Kothnur et al.
9,523,355 B2   12/2016  Taub
(Continued)

OTHER PUBLICATIONS

Search report an Written Opinion issued in Int'l App. serial No. PCT/US2022/038015 dated Nov. 4, 2022, 9 pages.

*Primary Examiner* — Anthony D Wiest
(74) *Attorney, Agent, or Firm* — PORTER HEDGES LLP; Jonathan Pierce; Pierre Campanac (57) ABSTRACT

An off-shore wind turbine system is assembled using a platform or jack-up vessel, and a first base anchored to the seafloor at a bade assembly off-shore location. A buoyant tower is attached to the first base. A crane provided on the platform or jack-up vessel is used to lift blades and blades, which are then coupled to a turbine held in a nacelle provided at the top of the buoyant tower. The buoyant tower, the nacelle, and the blades are detached from the first base. The buoyant tower, the nacelle, and the blades are towed to a wind farm and connected to a second base provided in the wind farm. The buoyant tower, the nacelle, and the blades are further stabilized using mooring lines spanning between the buoyant towers and other bases provided in the wind farm. The first base and/or the second base include anti-rotation features.

14 Claims, 8 Drawing Sheets

Related U.S. Application Data

(60) Provisional application No. 63/224,463, filed on Jul. 22, 2021.

(51) Int. Cl.
    *B63B 21/50*     (2006.01)
    *B63B 35/44*     (2006.01)
    *B63B 39/03*     (2006.01)
    *E02D 27/42*     (2006.01)
    *E02D 27/52*     (2006.01)
    *E02B 17/00*     (2006.01)

(52) U.S. Cl.
    CPC ............ *B63B 39/03* (2013.01); *E02D 27/425* (2013.01); *E02D 27/525* (2013.01); *B63B 2021/203* (2013.01); *B63B 2035/446* (2013.01); *E02B 2017/0091* (2013.01); *E02D 2600/20* (2013.01); *F05B 2240/93* (2013.01); *F05B 2240/95* (2013.01)

(58) Field of Classification Search
    CPC .......... E02B 2017/0065; F05B 2240/93; F05B 2240/95; F05B 2230/6102; F05B 2240/912; Y02E 10/72; Y02E 10/727
    See application file for complete search history.

(56) References Cited

U.S. PATENT DOCUMENTS

| | | | |
|---|---|---|---|
| 9,914,505 B2 * | 3/2018 | Nordstrom | ............ B63B 35/003 |
| 10,087,915 B1 | 10/2018 | Srinivan | |
| 2011/0074155 A1 | 3/2011 | Scholte-Wassink | |

* cited by examiner

OFF-SHORE WIND TURBINE SYSTEM AND METHOD OF INSTALLATION

CROSS-REFERENCE TO RELATED APPLICATIONS

This application is a continuation of Intl application serial no. PCT/US22/38015 filed on Jul. 22, 2022, which claims the benefit of priority to U.S. provisional application Ser. No. 63/224,463 filed on Jul. 22, 2021. Int'l application serial no. PCT/US22/38015 and U.S. provisional application Ser. No. 63/224,463 are incorporated herein by reference for all and any purposes.

This application is related to U.S. application Ser. No. 17/672,674, filed on Feb. 15, 2022, which is incorporated herein by reference for all and any purposes.

BACKGROUND

This disclosure relates generally to off-shore wind turbine systems and methods of installation of such systems. This disclosure relates more particularly to off-shore wind turbine systems that have significantly more rotational stiffness than would a spar of equivalent displacement and ballast while preserving the ability to tow the off-shore wind turbine systems in the vertical orientation.

Wind spars are typically designed to ensure that the maximum pitch angle experienced during an extreme storm is within normal design bounds. The maximum pitch angle occurs when the maximum moment caused by wind conditions is applied to the wind spar. The maximum moment for a wind spar is an actual operating condition and, therefore, is common.

For example, ensuring that this maximum pitch angle is within normal design bounds, usually 10 degrees, often equates to a mean pitch angle of approximately 4-5 degrees.

The mean pitch angle is calculated by dividing the mean wind moment by the rotational stiffness of the floating wind spar.

$$\sin(\text{mean pitch angle}) = \text{mean wind moment/rotational stiffness}$$

Thus, reducing the mean pitch angle requires increasing the rotational stiffness.

The rotational stiffness is primarily dependent on the metacentric height, often referred to as "GM," which is the difference between the center of buoyancy and the center of gravity and is a direct measure of the rotational stiffness.

Therefore, if the wind spar is entirely dependent on the rotational stiffness achieved while floating for stability, the amount of fixed ballast that is required may become excessive.

There is a need in the art for off-shore wind turbine systems that are not entirely dependent on the rotational stiffness of a wind spar. However, the capability to tow off-shore wind turbine systems in the vertical orientation after the nacelle and blades have been installed on the spar is a significant benefit. Therefore, the methods of installation of such systems preferably preserve the ability to tow the off-shore wind turbine systems in the vertical orientation.

BRIEF DESCRIPTION OF THE DRAWINGS

For a more detailed description of the embodiments of the disclosure, reference will now be made to the accompanying drawings, wherein:

FIG. 2b is a bottom view of the buoyant tower shown in FIG. 2a;

FIG. 4b is a side view of the buoyant assembly shown in FIG. 4a;

DETAILED DESCRIPTION

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

The disclosure describes an off-shore wind turbine system.

The off-shore wind turbine system may comprise a base. The base may include a central pile generally secured to the seafloor and, more specifically, inserted into the seafloor.

The off-shore wind turbine system may comprise a plurality of nearby piles that are generally secured to the seafloor and, more specifically, inserted into the seafloor. At least one of the plurality of nearby piles may be connected to a nearby central pile of a nearby base via an arm. The nearby base may be connected to a nearby buoyant tower.

The off-shore wind turbine system may comprise a buoyant tower that is connected to the base. The base may generally be connected to the buoyant tower via anti-rotation features that are provided on top of the base and configured to reduce the yaw motion of the buoyant tower relative to the base. Optionally, the anti-rotation features may further be configured to reduce a pitch motion or a roll motion of the buoyant tower relative to the base. More specifically, the anti-rotation features may include an embossing complementary to a matching embossing that is provided at the bottom of the buoyant tower.

The off-shore wind turbine system may comprise a plurality of mooring lines. Each of the plurality of mooring lines may generally be connected between the buoyant tower and a corresponding one of the plurality of nearby piles. More specifically, each of the plurality of mooring lines may be connected to the buoyant tower near the floatation line.

The off-shore wind turbine system may comprise a nacelle that is connected to the top of the buoyant tower, the nacelle including a turbine coupled to blades.

The disclosure describes a base for connecting to a buoyant tower of an off-shore wind turbine system.

The base may comprise a central pile configured to be secured to the seafloor. For example, the central pile may be configured to be inserted into the seafloor.

The base may comprise a plurality of peripheral piles configured to be secured to the seafloor. For example, each of the plurality of peripheral piles may be configured to be inserted into the seafloor. At least one of the plurality of peripheral piles is generally capable of connecting to a corresponding mooring line. For example, the least one of the plurality of peripheral piles may be provided with rigging equipment, such as an eye, a shackle, a turnbuckle, or a hook.

The base may comprise a plurality of arms connecting the central pile to a corresponding one of the plurality of peripheral piles.

The base may comprise anti-rotation features that are provided on top of the base and are capable of being connected to the buoyant tower. The anti-rotation features may be configured to reduce the yaw motion of the buoyant tower relative to the base, when in use. The anti-rotation features may generally include an embossing complementary to a matching embossing that is provided at the bottom of the buoyant tower. For example, the embossing includes at least a portion of a cruciform relief.

The disclosure describes a buoyant assembly of an off-shore wind turbine system for connecting to a base secured to a seafloor.

The buoyant assembly may comprise a buoyant tower. The buoyant tower may include an interface to the base. The interface may be located at the bottom of the buoyant tower. The buoyant tower may be capable of being connected to the base via anti-rotation features that are provided at the interface and are configured to reduce at least a yaw motion of the buoyant tower relative to the base. The anti-rotation features may generally include a matching embossing complementary to an embossing that is provided on top of the base. For example, the matching embossing may include at least a portion of a complementary cruciform relief. The buoyant tower may comprise a fixed ballast section that is located above the interface. The buoyant tower may comprise an air-over-water ballast tank that is located above the fixed ballast section. The air-over-water ballast tank may be configured to allow seawater to flow into the air-over-water ballast tank or to flood the air-over-water tank. The seawater can also be extracted from the air-over-water ballast tank. As such, the floatation of the buoyant tower (and consequently of the buoyant assembly) can be adjusted. The buoyant tower may be capable of being connected to a plurality of mooring lines, which may or may not be included in the buoyant assembly. For example, the buoyant tower may be provided with rigging equipment, such as a plurality of eyes, shackles, turnbuckles, hooks, or any combination thereof.

The buoyant assembly may comprise a nacelle. The nacelle may include a turbine therein. The nacelle may be connected to the top of the buoyant tower. Preferably, blades are not initially coupled to the turbine.

The buoyant assembly may comprise a protective structure that is temporarily attached to the nacelle. The protective structure may generally cover the nacelle to prevent the nacelle from getting wet during tow-out. For example, the protective structure may comprise a cofferdam or bow-like hull.

The buoyant assembly may comprise temporary buoyancy devices that are releasably attached to the buoyant tower. More specifically, the temporary buoyancy devices may be attached near the fixed ballast section of the buoyant tower.

The disclosure describes a method of assembling an off-shore wind turbine system.

The method may involve providing a platform or jack-up vessel and a first base generally anchored to the seafloor at a first off-shore location. The first base may be adjacent to the first base. The platform or jack-up vessel may generally include lifting means, such as a crane. For example, the platform or jack-up vessel may be an electrical transformer platform of the wind farm.

The method may involve attaching temporary buoyancy devices to a buoyant tower. A nacelle may be provided at the top of the buoyant tower. The nacelle may include a turbine. Preferably, blades are not initially coupled to the turbine.

The method may involve towing the buoyant tower toward the first off-shore location. During towing, the nacelle may be kept out of the water by using, for example, a cofferdam or bow-like hull that is temporarily attached to the nacelle and at least partially covers the nacelle.

The method may involve detaching the temporary buoyancy devices and, if provided, the cofferdam or bow-like hull from the buoyant tower near the first off-shore location.

The method may generally involve upending the buoyant tower. The upending of the buoyant tower may more particularly involve allowing seawater to flow into or flood an air-over-water ballast tank included in the buoyant tower.

The method may involve attaching a buoyant tower to the first base. A temporary connection between the buoyant tower and the first base may reduce at least a yaw motion of the buoyant tower relative to the first base.

The method may involve lifting blades with the lifting means while the buoyant tower is generally immobile, for example, attached to the first base and held against the platform or jack-up vessel.

The method may involve coupling the blades to the turbine held in the nacelle.

The method may involve detaching the buoyant tower, the nacelle, and the blades from the first base. The detaching may involve extracting seawater from the air-over-water ballast tank.

The method may involve towing the buoyant tower, the nacelle, and the blades to a second off-shore location in a wind farm.

The method may involve providing at least a second base at the second off-shore location in the wind farm. The second base may be secured to the seafloor, such as inserted into the seafloor. Preferably, a plurality of nearby bases are also available in the wind farm.

The method may involve connecting the buoyant tower, the nacelle, and the blades to the second base. The connection may reduce at least a yaw motion of the buoyant tower relative to the second base.

The method may involve connecting a plurality of mooring lines between the buoyant tower and a corresponding one of the plurality of nearby bases.

Example of a Wind Farm

Figure 1:
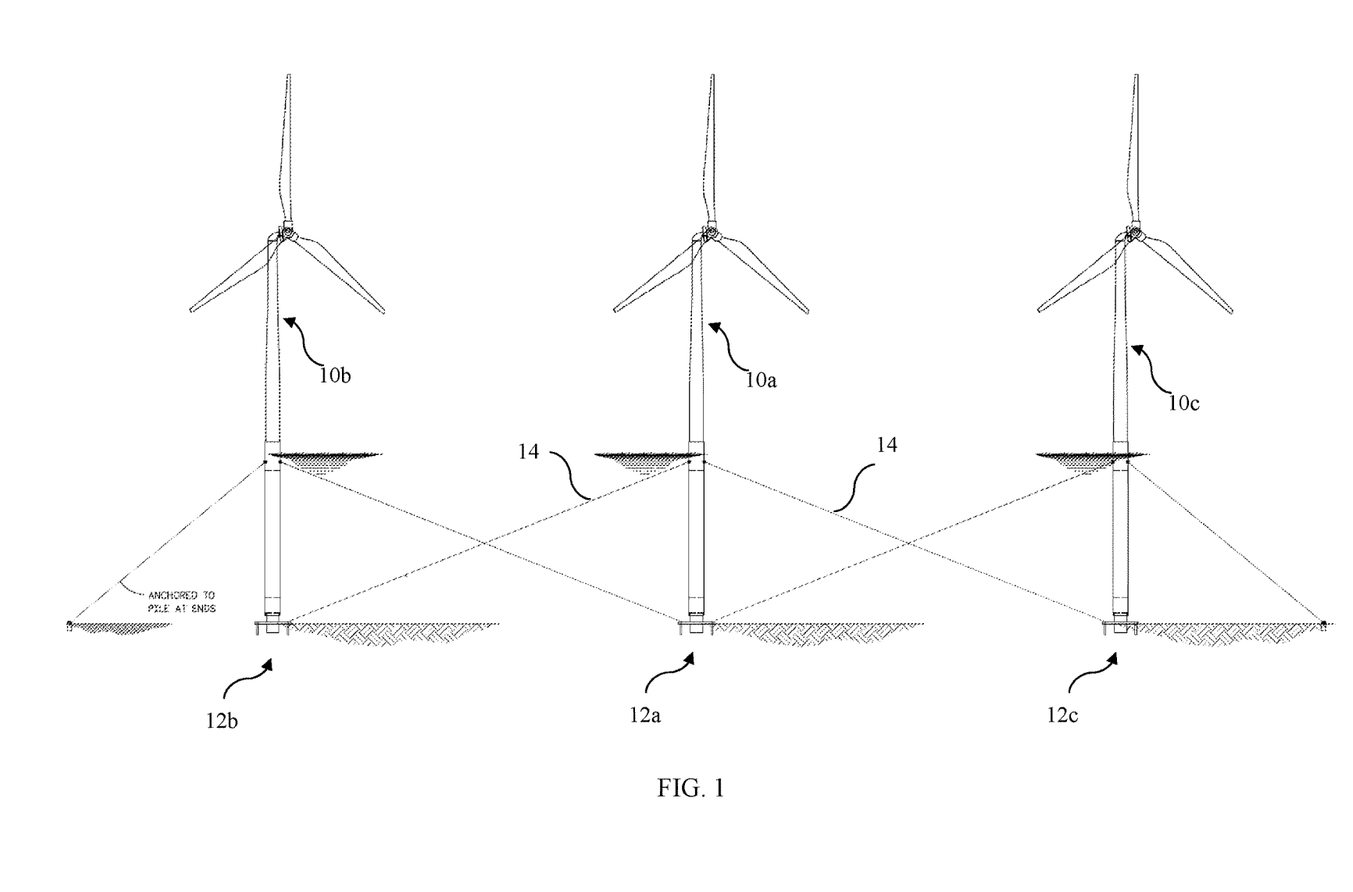
FIG. 1 is an elevation view of a wind farm having buoyant towers.

An example of a wind farm having buoyant towers is shown in FIG. 1. The wind farm comprises floating wind structures with an additional stability mechanism. For simplicity, only three floating wind structures are illustrated in FIG. 1. However, a wind farm can have more than three floating wind structures. Furthermore, the three floating wind structures are illustrated on the same line in FIG. 1. However, a wind farm can have a bi-dimensional pattern (e.g., a checkered pattern) of floating wind structures.

Buoyant towers 10a, 10b, and 10c can be used in shallow water instead of the spar-like structures discussed in the background. The principle providing rotational stiffness to a buoyant tower is similar to the principle providing rotational stiffness to a spar. However, in contrast to spar-like structures, bases or foundations 12a, 12b, and 12c are provided for the buoyant towers 10a, 10b, and 10c, respectively, to sit on.

For adding stability to floating wind structures in the 300-1000' water depth range, mooring lines 14 can be connected to the buoyant tower 10a. The mooring lines 14 can reduce the wind moments and also add to the righting moment.

The bases 12b and 12c can also provide an anchoring location for the mooring lines 14 that are attached to the buoyant tower 10a. One of the significant cost items for any floating structure is the anchoring, and the dual use of these bases can provide a significant reduction in cost and complexity.

Example of Making a Buoyant Tower with Anti-Rotation Features

Figure 2A:
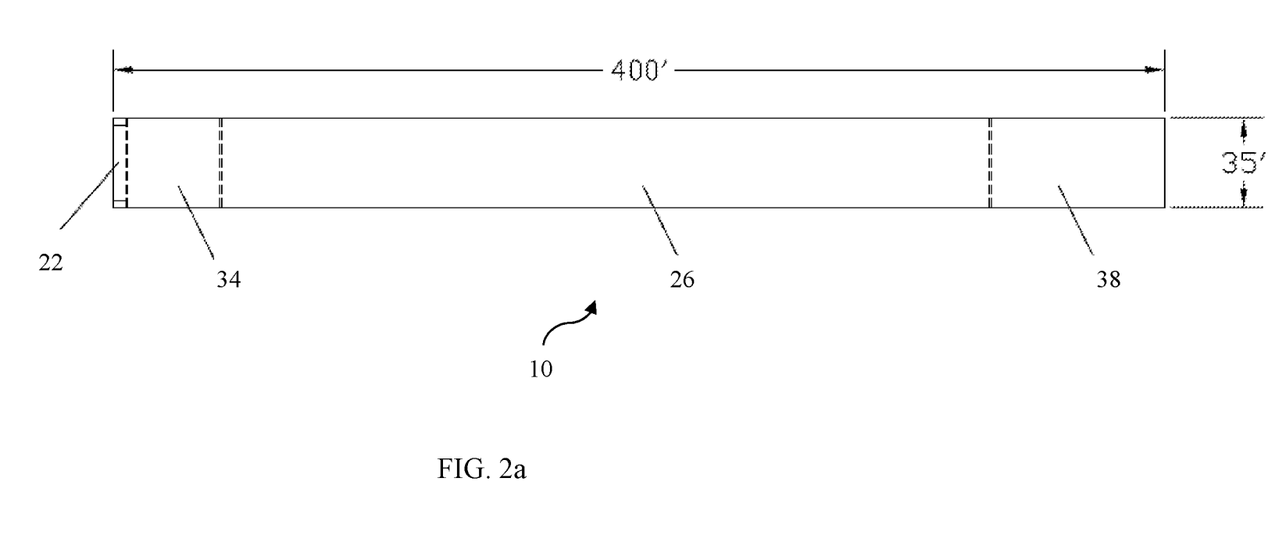
FIG. 2a is an elevation view of a buoyant tower.
Figure 2B:
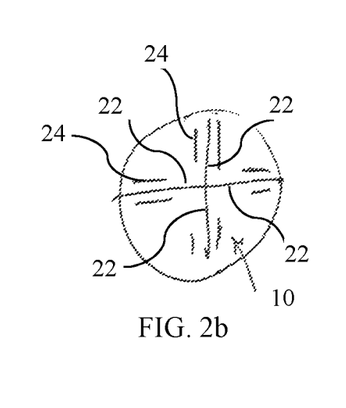

An example of a buoyant tower 10 is shown in FIGS. 2a-2b.

Preferably, the buoyant towers 10a, 10b, and 10c work well in water depths that are in the above-mentioned range. In order to provide economic wind farms, the repeatability of the various phases involved in the making of the buoyant towers 10a, 10b, and 10c is maximized.

An example of buoyant tower could be 35 feet in diameter, 400 feet in length, primarily ring stiffened, and with only minimal internal compartmentation. In contrast, a typical buoyant tower suitable for use in a deepwater environment has significant compartmentation due to both safety (for manned operations) and redundancy in the event of a collision with the buoyant tower that breaches a pressure surface. Given the unmanned nature of operations and the lack of weight eccentricity that must be counteracted, minimal compartmentation is sufficient for providing a very simple buoyant tower suitable for use in a wind farm located in the 300-1000' water depth range. The manufacture of such a buoyant tower can be largely automated.

The buoyant tower can be rolled with mechanized or automated welding, thereby providing a tower that can be built with minimal man-hours. For example, the tower may be built using methods disclosed in related U.S. application Ser. No. 17/672,674.

The buoyant tower 10 comprises an interface 22 to the base 12 (in FIGS. 3a-3b), which is provided at the bottom of the buoyant tower 10. The interface 22 includes anti-rotation features. The anti-rotation features include a form of embossing (e.g., a cruciform relief) that is made of steel. Elastomers 24 are used to make contact between the anti-rotation features of the interface 22 and the anti-rotation features of the base 12 (in FIGS. 3a-3b). Elastomers 24 provide stiffness both for pitch/roll and for yaw.

The buoyant tower 10 comprises a fixed ballast section 34, which is located above the interface 22. For an equivalent righting moment, the weight of fixed ballast section 34 required in the buoyant towers 10a, 10b, and 10c is significantly lower than the weight required in a spar due to the fact that the righting moment is greatly increased by the presence of the mooring lines 14. The weight of the fixed ballast section 34 can be selected based on the vertical tow to the location in the wind farm after the nacelle and the wind turbine blades have been installed.

The buoyant tower 10 comprises an air-over-water ballast tank 26, which is located above the fixed ballast section 34. The air-over-water ballast tank 26 can be used for upending the buoyant tower 10.

The buoyant tower 10 can comprise a void tank 38, which is located above the air-over-water ballast tank 26.

Example of Making a Base with Anti-Rotation Features

Figure 3A:
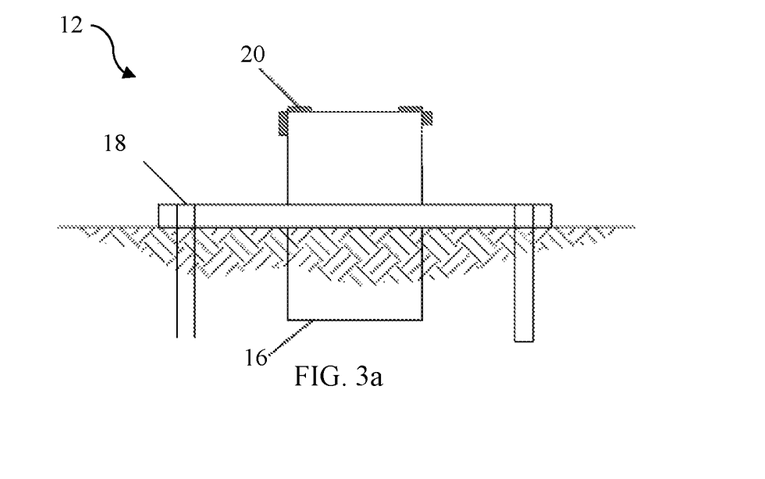
FIG. 3a is an elevation view of a base.
Figure 3B:
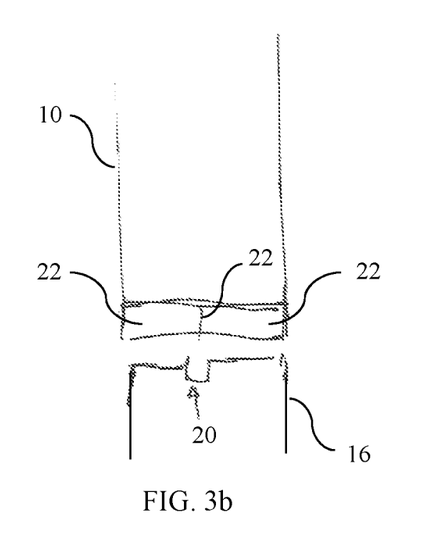
FIG. 3b is a schematic view of the base shown in FIG. 3a about to interface with a buoyant tower.

An example of a base 12 with an interface 20 to a buoyant tower 10 is shown in FIGS. 3a-3b. The interface 20 includes anti-rotation features that correspond to the anti-rotation features of the interface 22 of the buoyant towers 10.

The base 12 has a central pile 16, one or more peripheral piles 18, and extension arms connecting the central pile 16 to the peripheral piles 18. The central pile 16 is preferably a suction pile. The peripheral piles 18 are preferably micropiles. The base 12 is the component that provides lateral and vertical resistive forces during operation. More than two peripheral piles 18 can be distributed all around the central pile 16.

The mooring lines 14 (in FIG. 1) for stabilizing a buoyant tower can be connected between the buoyant tower and any of the peripheral piles 18 of a nearby base 12 (i.e., a base for another buoyant tower). Since the anchoring represents a substantial fraction of the cost of wind farm installations, being able to anchor the floating wind structures to multiple other bases is an improvement.

The central pile 16 of the base 12 is equipped with the interface 20 that the interface 22 of the buoyant tower 10 can engage, thereby allowing the reduction/elimination of any yaw motions. The anti-rotation features of the interface 20 include a matching embossing (e.g., a complementary cruciform relief) to that which is provided on the interface 22. Optionally, the anti-rotation features of the interface 20 can include elastomers.

The designs of the interface 20 and the interface 22 can be swapped so that the embossing of interface 20 is a cruciform relief and the embossing of interface 22 is a complementary cruciform relief. The designs of the interface 20 and the interface 22 can be mixed so that the embossings of both the interface 20 and the interface 22 are part of a cruciform relief and part of a complementary cruciform relief.

Example of Pre-Installation, Tow-Out, and Upending of a Buoyant Tower

Figure 4A:
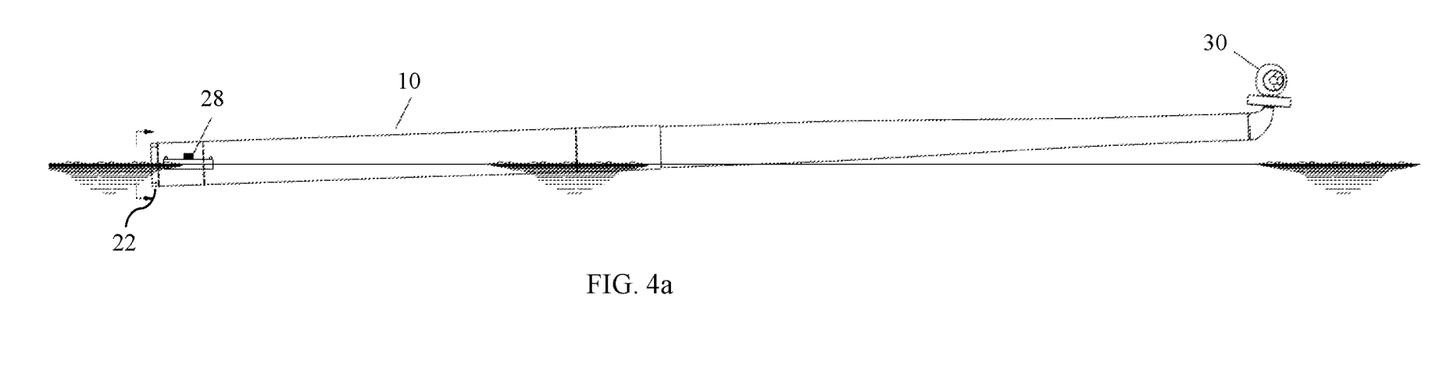
FIG. 4a is an elevation view of a buoyant assembly having a nacelle pre-installed to a buoyant tower.
Figure 4B:
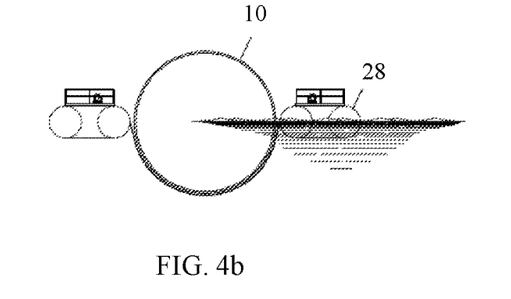
Figure 5:
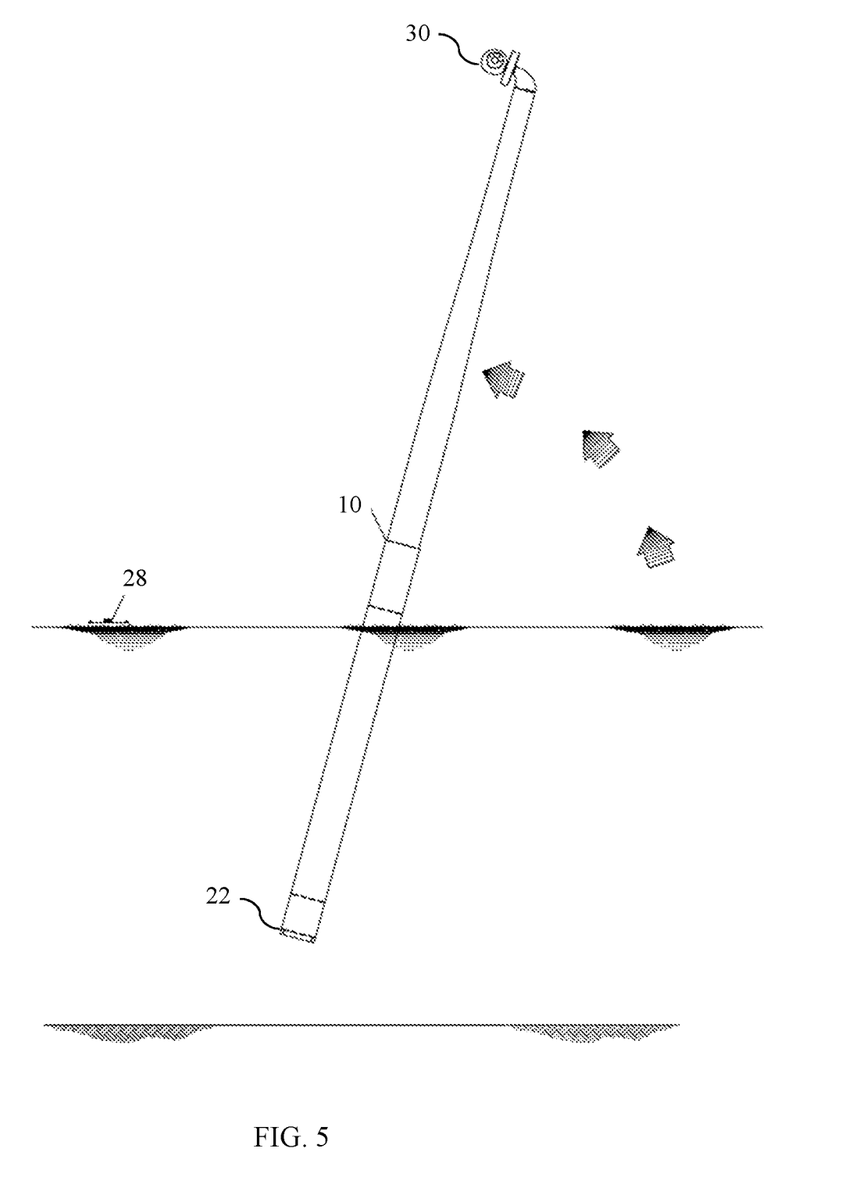
FIG. 5 illustrates the upending of the buoyant assembly shown in FIGS. 4a and 4b.

An example of pre-installation prior to the tow-out of a buoyant tower 10 is shown in FIGS. 4a-4b and 5.

Turning to FIGS. 4a-4b, the fixed ballast can be pre-installed in the buoyant tower 10, as long as some temporary buoyancy 28 is provided on the fixed ballast end. This temporary buoyancy 28 can be released as part of the upending process.

If the nacelle 30, which includes a generator and direct drive, is to be pre-installed, a protective structure preferably covers the nacelle 30 because it can be difficult to count on the angle to keep the nacelle 30 out of the water. This protective structure can take the form of a cofferdam and bow-like hull that is temporarily attached and retrieved afterward. This protective structure should ideally remain in position until after the upending process so that the nacelle 30 is not getting wet.

Turning to FIG. 5, after tow-out to a location near a blade assembly location, the buoyant tower 10 is upended by flowing seawater into the air-over-water ballast tank 26 (in FIG. 3*a*) or flooding the air over ballast tank 26 with seawater.

Example of Installing Blades on a Buoyant Tower

Figure 6:
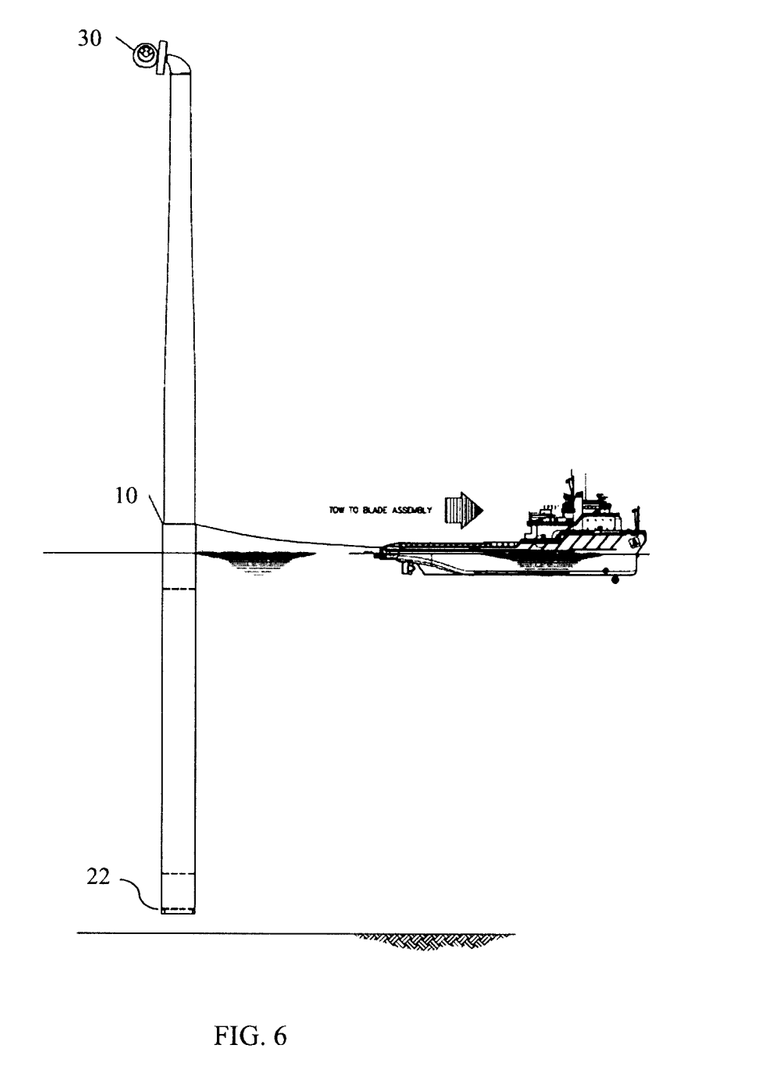
FIG. 6 illustrates the towing-out of the buoyant assembly shown in FIGS. 4a and 4b to a blade assembly location.
Figure 7:
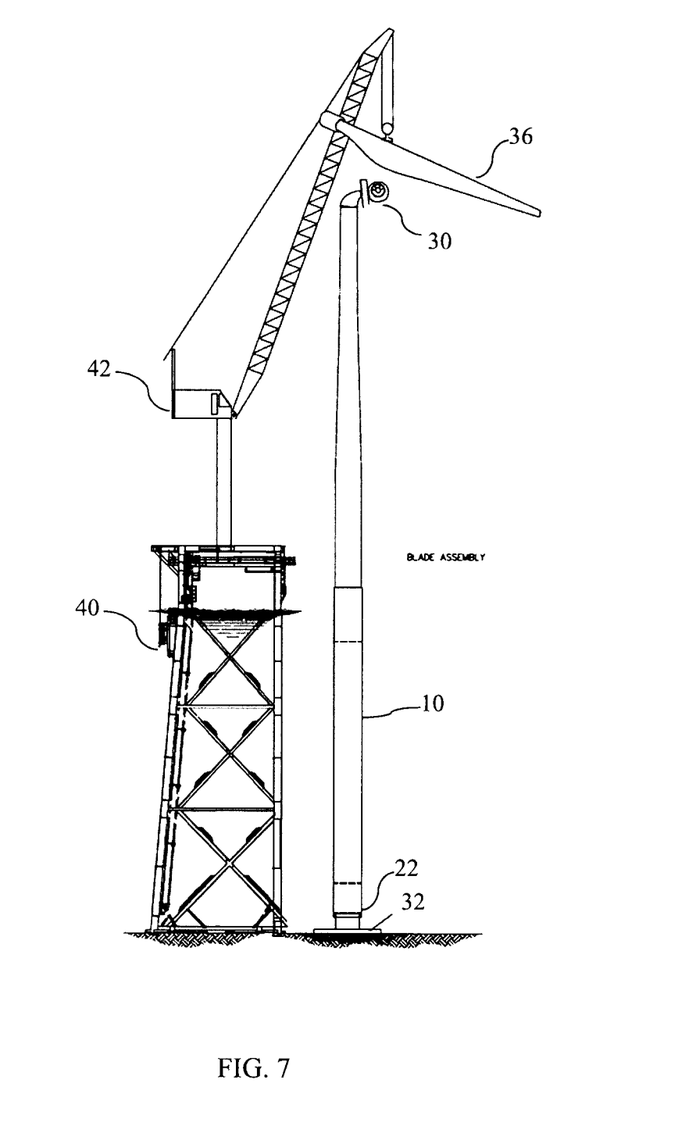
FIG. 7 illustrates the coupling of blades to the buoyant assembly shown in FIGS. 4a and 4b at the blade assembly location.
Figure 8:
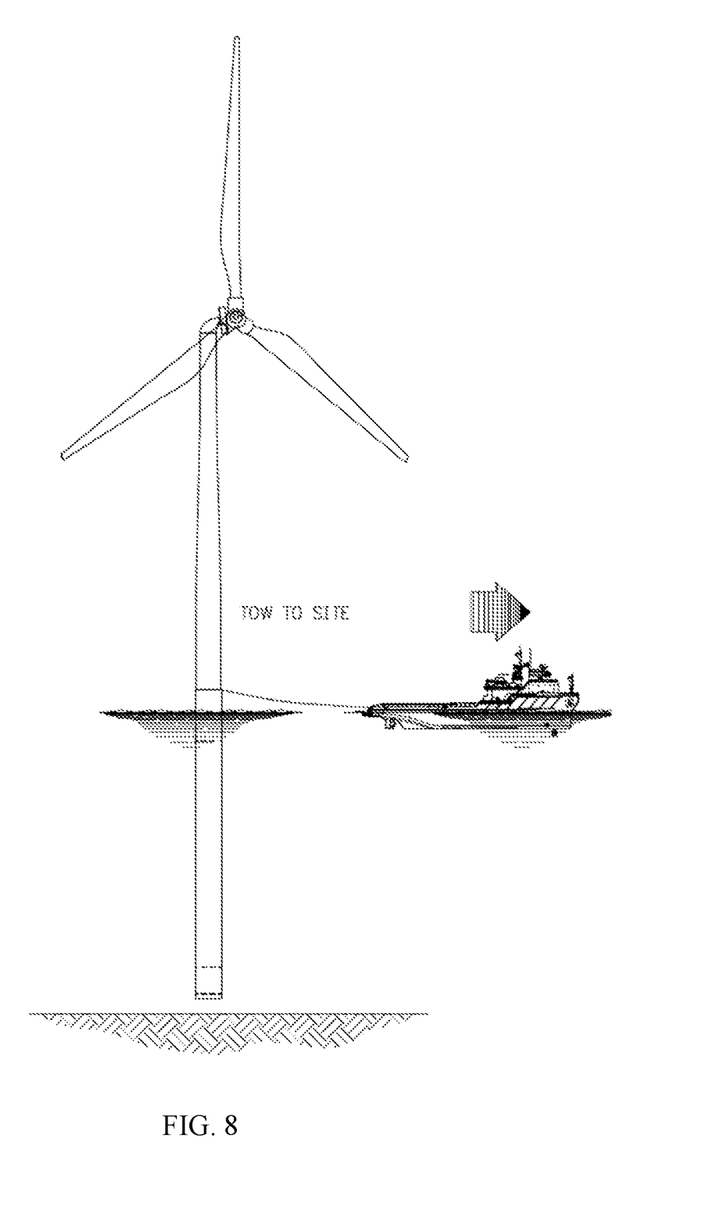
FIG. 8 illustrates the towing-out of the buoyant assembly and blades coupled thereto to the wind farm shown in FIG. 1.

An example of a sequence of installation of a buoyant tower 10 is shown in FIGS. 6-8, which would be followed by FIG. 1 for the installation of the buoyant tower in the wind farm.

A temporary installation location (illustrated in FIG. 7) can be established that allows repetitive installation of the wind turbine blades 36. The temporary location has a base 32 that is similar to the bases 12*a*, 12*b*, and 12*c* that are used in the wind farm, although there may be a need to have the base 32 adjustable in height to accommodate various planned water depths.

An approach to the installation would be to provide crane capabilities that could be added onto the electrical transformer platform 40 during installation operations. If the nacelle 30 is pre-installed (i.e., before tow-out, as shown in FIG. 4), the crane can take the form of a high hook height, low capacity crane 42 to just lift the blades 36. If the nacelle 30 must also be lifted, a modular lifting tower may be a better approach (as shown in related U.S. application Ser. No. 17/672,674). The interfaces for either of these cranes can be designed into the electrical transformer platform 40.

More generally, the temporary installation location can use the following lifting methods.

(A) A standard installation vessel (e.g., a jack-up rig) mobilizes to a fixed location where the base 32 is set, and then all operations are conducted by bringing the buoyant towers 10 to this location. This vessel alleviates the need to jack up the rig at several locations in the wind farm. The standard installation vessel is used for the installation of both nacelle 30 and blades 36.

(B) A fixed platform has purpose-built capabilities that are sufficient for the installation of either a full nacelle 30 or just the blades 36. For example, the fixed platform may be the electrical transformer platform 40 of the wind farm.

(C) A fixed platform has add-on components to perform the lift of the nacelle 30 and/or the blades 36. An example of a platform that is self-erecting is shown in related U.S. application Ser. No. 17/672,674.

The sequence of installation of a buoyant tower 10 that is shown in FIGS. 6-8 could also be used for off-shore wind turbine systems that use spars (which are floating) instead of buoyant towers.

In addition to the foregoing, the disclosure also contemplates at least the following embodiments:

Embodiment 1

Embodiment 1 is an off-shore wind turbine system. The off-shore wind turbine system comprises a base secured to the seafloor at a first location, a plurality of nearby peripheral piles located near the base and also secured to the seafloor, and a buoyant tower. For example, the central pile may include a suction pile inserted into the seafloor, and each of the plurality of nearby peripheral piles may include a micropile inserted into the seafloor.

In order to stabilize the buoyant tower, the buoyant tower is connected to the base. In addition, a plurality of mooring lines are each connected between the buoyant tower and a corresponding one of the plurality of nearby peripheral piles.

The off-shore wind turbine system comprises an assembly including a nacelle and the buoyant tower. A turbine is provided in the nacelle. In the assembly, the nacelle has been connected to the top of the buoyant tower.

The off-shore wind turbine system may comprise blades that can be coupled to the turbine.

Preferably, the assembly comprising the buoyant tower and the nacelle may be towed to a second location that is remote from the first location. At the second location, a platform or jack-up vessel including a crane or other lifting means and a temporary base is provided. The assembly may be connected to the temporary base at the second location and secured to the platform or jack-up vessel. The crane or other lifting means may be used to hoist the blades so that the blades can be coupled to the turbine. After the blades are coupled to the turbine, the assembly and the blades coupled thereto may be disconnected from the temporary base and towed to the first location.

Embodiment 2

Embodiment 2 is an off-shore wind turbine system in accordance with embodiment 1, wherein the first location is a wind farm. Thus, the off-shore wind turbine system is part of a wind farm.

At least one of the plurality of nearby peripheral piles, and preferably each of the plurality of nearby peripheral piles, is connected to a corresponding one of a plurality of nearby central piles, preferably via a corresponding one of a plurality of nearby arms. Each nearby peripheral pile, corresponding one of the plurality of nearby central piles, and corresponding one of the plurality of nearby arms is part of one of a plurality of nearby bases. At least one of the plurality of nearby bases, and preferably each of the plurality of the nearby bases, is coupled to a corresponding one of a plurality of nearby buoyant towers to stabilize the corresponding one of the nearby buoyant towers.

The base may optionally comprise a plurality of peripheral piles that are coupled to the central pile, for example, via a corresponding one of a plurality of arms. Optionally, at least one of the plurality of nearby buoyant towers, and preferably each of the plurality of other buoyant towers, is also moored using a corresponding one of a plurality of other mooring lines. At least one of the plurality of other mooring lines, and preferably each of the plurality of other mooring lines, is connected between the corresponding one of the plurality of nearby buoyant towers and a corresponding one of the plurality of peripheral piles.

Embodiment 3

Embodiment 3 is an off-shore wind turbine system in accordance with embodiments 1 or 2, wherein the base of the off-shore wind turbine system is connected to the buoyant tower via one or more anti-rotation features provided on top of the base and configured to reduce the yaw motion of the buoyant tower relative to the base.

Embodiment 4

Embodiment 4 is an off-shore wind turbine system in accordance with embodiment 3, wherein the one or more anti-rotation features are further configured to reduce the pitch and roll motion of the buoyant tower relative to the base.

Embodiment 5

Embodiment 5 is an off-shore wind turbine system in accordance with embodiments 3 or 4, wherein the one or more anti-rotation features include an embossing complementary to a matching embossing that is provided at the bottom of the buoyant tower.

Embodiment 6

Embodiment 6 is an off-shore wind turbine system in accordance with embodiment 5, wherein the embossing includes at least a portion of a cruciform relief.

Embodiment 7

Embodiment 7 is a base for connecting to a buoyant tower of an off-shore wind turbine system. The base comprises a central pile configured to be secured to the seafloor and a plurality of peripheral piles also configured to be secured to the seafloor. For example, the central pile may be a suction pile capable of being inserted into the seafloor. At least one of the plurality of peripheral piles, and preferably each of the plurality of peripheral piles, may be a micropile capable of being inserted into the seafloor. The base comprises a plurality of arms connecting the central pipe to a corresponding one of the plurality of peripheral piles. At least one of the plurality of peripheral piles, and preferably each of the plurality of peripheral piles, is capable of connecting to a corresponding one of a plurality of mooring lines, for example, via rigging equipment attached to the peripheral piles.

Embodiment 8

Embodiment 8 is a base in accordance with embodiment 7, wherein the base of the off-shore wind turbine system is capable of being connected to the buoyant tower via one or more anti-rotation features provided on top of the base and configured to reduce the yaw motion of the buoyant tower relative to the base.

Embodiment 9

Embodiment 9 is a base in accordance with embodiment 8, wherein the one or more anti-rotation features are further configured to reduce the pitch and roll motion of the buoyant tower relative to the pile.

Embodiment 10

Embodiment 10 is a base in accordance with embodiments 8 or 9, wherein the one or more anti-rotation features include an embossing complementary to a matching embossing that is provided at the bottom of the buoyant tower.

Embodiment 11

Embodiment 11 is a base in accordance with embodiment 10, wherein the embossing includes at least a portion of a cruciform relief.

Embodiment 12

Embodiment 12 is a buoyant assembly of an off-shore wind turbine system for connecting to a base secured to a seafloor. The buoyant assembly comprises a nacelle and a buoyant tower. A turbine, and optionally a direct drive, is(are) provided in the nacelle. In the assembly, the nacelle is connected to the top of the buoyant tower.

The buoyant tower comprises an interface to the base, which is provided at the bottom of the buoyant tower. The buoyant tower of the off-shore wind turbine system is capable of being connected to the base via one or more anti-rotation features provided at the interface and configured to reduce the yaw motion of the buoyant tower relative to the base. The buoyant tower comprises a fixed ballast section, which is located above the interface. The buoyant tower comprises an air-over-water ballast tank, which is located above the fixed ballast section. The air-over-water ballast tank is configured to allow seawater to flow into the air-over-water ballast tank or to flood the air-over-water tank. The buoyant tower is capable of being connected to a plurality of mooring lines, for example, via rigging equipment attached to the hull of the buoyant tower.

Optionally, the buoyant assembly comprises the plurality of mooring lines.

Embodiment 13

Embodiment 9 is a buoyant assembly, wherein the one or more anti-rotation features are further configured to reduce the pitch and roll motion of the buoyant tower relative to the pile.

Embodiment 14

Embodiment 14 is a buoyant assembly in accordance with embodiments 12 or 13, wherein the one or more anti-rotation features include a matching embossing complementary to an embossing that is provided on top of the base.

Embodiment 15

Embodiment 15 is a buoyant assembly in accordance with embodiment 14, wherein the matching embossing includes at least a portion of a complementary cruciform relief.

Embodiment 16

Embodiment 16 is a buoyant assembly in accordance with any of embodiments 12 to 15, wherein the buoyant tower comprises a void tank, which is located above the air-over-water ballast tank.

Embodiment 17

Embodiment 17 is a buoyant assembly in accordance with any of embodiments 12 to 16, wherein a protective structure is temporarily attached to the nacelle. The protective structure covers the nacelle to prevent the nacelle from getting wet during tow-out.

Embodiment 18

Embodiment 18 is a buoyant assembly in accordance with embodiment 17, wherein the protective structure comprises a cofferdam or bow-like hull.

Embodiment 19

Embodiment 19 is a buoyant assembly in accordance with any of embodiments 12 to 18, wherein temporary buoyancy devices are attached to the buoyant tower.

Embodiment 20

Embodiment 20 is a method of assembling an off-shore wind turbine system. The method comprises the step of providing a platform or jack-up vessel and a first base anchored to the seafloor at a first off-shore location. The platform or jack-up vessel includes a crane or other lifting means. The method comprises the step of attaching a buoyant tower to the first base. The method comprises the steps of lifting blades with the crane or other lifting means, while the buoyant tower is attached to the first base, and coupling the blades to a turbine held in a nacelle provided at the top of the buoyant tower. The method comprises the step of detaching the buoyant tower, the nacelle, and the blades from the first base. The method comprises the step of towing the buoyant tower, the nacelle, and the blades to a second off-shore location in a wind farm.

For example, the buoyancy tower may be part of a buoyant assembly in accordance with any of embodiments 12 to 19.

Embodiment 21

Embodiment 21 is a method in accordance with embodiment 20, wherein the height of the first base is adjustable.

Embodiment 22

Embodiment 22 is a method in accordance with embodiments 20 or 21, wherein the method further comprises the step of providing a second base at the second off-shore location in the wind farm. For example, the second base may be in accordance with any of embodiments 7 to 11. The method further comprises the step of connecting the buoyant tower to the second base. The method further comprises the step of connecting a plurality of mooring lines between the buoyant tower and a corresponding one of a plurality of nearby bases.

Embodiment 23

Embodiment 23 is a method in accordance with any of embodiments 20 to 22, wherein the method further comprises the steps of attaching temporary buoyancy devices to the buoyant tower, towing the buoyant tower toward the first off-shore location while the temporary buoyancy devices are attached to the buoyant tower, detaching the temporary buoyancy devices from the buoyant tower near the first off-shore location; and upending the buoyant tower.

Embodiment 24

Embodiment 23 is a method in accordance with any of embodiments 20 to 23, wherein the method further comprises the steps of keeping the nacelle coupled at the top of the buoyant tower and out of the water while towing the buoyant tower toward the first off-shore location.

Embodiment 25

Embodiment 25 is a method in accordance with any of embodiments 20 to 24, which is performed to build an off-shore wind turbine system in accordance with any of embodiments 1 to 6.

The claimed invention is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. An off-shore wind turbine system, comprising:
   a base including a central pile secured to the seafloor;
   a plurality of nearby piles secured to the seafloor;
   a buoyant tower connected to the base;
   a nacelle connected to a top of the buoyant tower, the nacelle including a turbine coupled to blades; and
   a plurality of mooring lines, each connected between the buoyant tower and a corresponding one of the plurality of nearby piles,
   wherein the base is connected to the buoyant tower via anti-rotation features provided on top of the base and configured to reduce a yaw motion of the buoyant tower relative to the base.

2. The system of claim 1, wherein at least one of the plurality of nearby piles is connected to a nearby central pile of a nearby base via an arm, and wherein the nearby base is connected to a nearby buoyant tower.

3. The system of claim 1, wherein the anti-rotation features are further configured to reduce a pitch motion or a roll motion of the buoyant tower relative to the base.

4. The system of claim 3, wherein the anti-rotation features include an embossing complementary to a matching embossing that is provided at the bottom of the buoyant tower.

5. A base for connecting to a buoyant tower of an off-shore wind turbine system, comprising:
   a central pile configured to be secured to the seafloor;
   a plurality of peripheral piles configured to be secured to the seafloor; and
   a plurality of arms connecting the central pile to a corresponding one of the plurality of peripheral piles,
   wherein at least one of the plurality of peripheral piles is capable of connecting to a corresponding mooring line,
   wherein the base includes anti-rotation features provided on top of the base and capable of being connected to the buoyant tower, wherein, in use, the anti-rotation features are configured to reduce the yaw motion of the buoyant tower relative to the base.

6. The base of claim 5, wherein the anti-rotation features include an embossing complementary to a matching embossing that is provided at the bottom of the buoyant tower.

7. The base of claim 6, wherein the embossing includes at least a portion of a cruciform relief.

8. A buoyant assembly of an off-shore wind turbine system for connecting to a base secured to a seafloor, comprising:
   a buoyant tower; and
   a nacelle including a turbine therein, wherein the nacelle is connected to a top of the buoyant tower;
   wherein the buoyant tower includes an interface to the base, the interface being located at a bottom of the buoyant tower,
   wherein the buoyant tower is capable of being connected to the base via anti-rotation features provided at the interface and configured to reduce a yaw motion of the buoyant tower relative to the base,
   wherein the buoyant tower comprises a fixed ballast section that is located above the interface,
   wherein the buoyant tower comprises an air-over-water ballast tank that is located above the fixed ballast section, the air-over-water ballast tank being configured to allow seawater to flow into the air-over-water ballast tank or to flood the air-over-water tank, and wherein the buoyant tower is capable of being connected to a plurality of mooring lines.

9. The buoyant assembly of claim 8, further comprising the plurality of mooring lines.

10. The buoyant assembly of claim 8, wherein the anti-rotation features include a matching embossing complementary to an embossing that is provided on top of the base.

11. The buoyant assembly of claim 10, wherein the matching embossing includes at least a portion of a complementary cruciform relief.

12. The buoyant assembly of claim 8, further comprising a protective structure that is temporarily attached to the nacelle, wherein the protective structure covers the nacelle to prevent the nacelle from getting wet during tow-out.

13. The buoyant assembly of claim 12, wherein the protective structure comprises a cofferdam or bow-like hull.

14. The buoyant assembly of claim 8, further comprising temporary buoyancy devices that are attached near the fixed ballast section of the buoyant tower.

\* \* \* \* \*